United States Patent Office 3,205,193
Patented Sept. 7, 1965

3,205,193
SYNERGISTIC STABILIZATION OF POLYPROPYLENE WITH TRIAZINES, BENZOTRIAZOLES AND THIODIPROPIONIC ESTERS
Martin Dexter, White Plains, John J. Hayes, Chappaqua, and Robert M. Pines, Spring Valley, N.Y., assignors to Geigy Chemical Corporation, Ardsley, N.Y., a corporation of Delaware
No Drawing. Filed Dec. 1, 1960, Ser. No. 72,885
17 Claims. (Cl. 260—45.8)

This invention relates to a process for the stabilization of normally solid polymers of propylene against deterioration due, e.g. to molecular oxidation, heat, and/or light. The invention also relates to compositions of polypropylene stabilized by said process. The invention further relates to the novel synergistic combination of stabilizers for polypropylene.

It is known that normally solid polymers of propylene are subject to deterioration. It has now been found that surprisingly stable compositions of polypropylene are produced when there is admixed therewith a minor portion of a stabilizer system comprising dilauryl-beta-thiodipropionate (hereinafter referred to as DLTDP) and at least one additional stabilizer having the general Formula I, II or III:

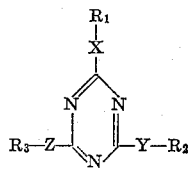

I wherein
$R_1$ and $R_2$ each independently represent an alkyl group of from 1 to 18 carbon atoms, e.g. methyl, ethyl, propyl, butyl, pentyl, octyl, dodecyl, octadecyl, etc., a cycloalkyl group having 5 or 6 carbon atoms, e.g. cyclopentyl or cyclohexyl, a phenyl group, an alkylphenyl group of from 7 to 24 carbon atoms, e.g. methylphenyl, ethylphenyl, butylphenyl, octylphenyl, octadecylphenyl, dimethylphenyl, dibutylphenyl, dioctadecylphenyl, etc., carbalkoxyalkyl of 3 to 15 carbon atoms, e.g. carbomethoxymethyl, carbethoxyethyl, carbobutoxyethyl, carbo-n-lauryloxyethyl, etc. or carbalkoxyphenyl of 8 to 19 carbon atoms, e.g. carbomethoxyphenyl, carbethoxyphenyl, carbo-n-octyloxyphenyl, carbo-n-lauryloxyphenyl, etc.

$R_3$ represents alkylhydroxyphenyl of 7 to 24 carbon atoms, e.g. methylhydroxyphenyl, ethylhydroxyphenyl, butylhydroxyphenyl, octylhydroxyphenyl, octadecylhydroxyphenyl, di-t-butylhydroxyphenyl, methyl-di-t-butylhydroxyphenyl, etc., and X, Y, and Z independently each represent a sulfur atom, oxygen atom, imino or substituted imino group, preferably aralkyl imino, e.g. benzylimino.

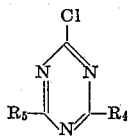

II wherein
$R_4$ represents alkylhydroxyanilino, preferably alkylhydroxyanilino having 7 to 24 carbon atoms, e.g. methylhydroxyanilino, ethylhydroxyanilino, butylhydroxyanilino, octylhydroxyanilino, dodecylhydroxyanilino, octadecylhydroxyanilino, di-t-butylhydroxyanilino, methyl-di-t-butylhydroxyanilino, etc., and alkylthio, preferably alkylthio having 1 to 18 carbon atoms, e.g. methylthio, ethylthio, propylthio, butylthio, octylthio, dodecylthio, octadecylthio, etc., and $R_5$ represents alkylhydroxyanilino, preferably alkylhydroxyanilino as defined in $R_4$ above.

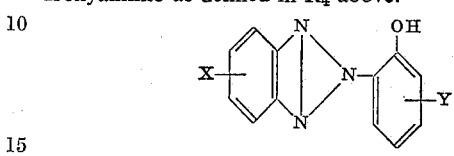

III wherein
Y represents at least one alkyl having 1 to 6 carbon atoms, preferably methyl in para position relative to OH, and
X represents at least one halogen (e.g. F, Br, Cl, I), or hydrogen, X being preferably hydrogen.

A particularly advantageous subclass of individual stabilizers comprises compounds of the Formula I(1):

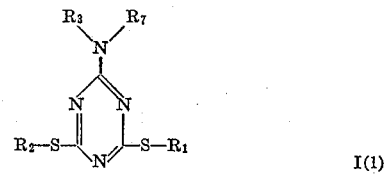

I(1)

wherein
$R_1$, $R_2$ and $R_3$ are defined as above, and
$R_7$ represents hydrogen or benzyl, especially hydrogen.

Another especially advantageous subclass of individual stabilizers comprises compounds of the Formula I(2):

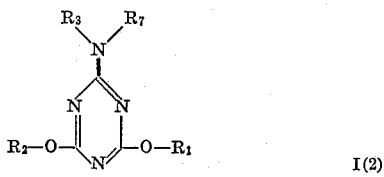

I(2)

wherein
$R_1$ and $R_2$ each independently represent any group as first defined above, but especially an alkylphenyl group, such as methyl-, ethyl-, butyl-, octyl-, dodecyl-, octadecylphenyl, etc.,
$R_3$ represents any group as defined above, but especially an alkylhydroxyphenyl group as defined in Formula I above, and
$R_7$ represents benzyl, or more advantageously hydrogen.

A particularly valuable stabilizer system for use in stabilizing compositions of normally solid polypropylene comprises from about 0.05% to about 10%, especially from 0.01% to 5% by weight, of a mixture of DLTDP with at least one triazine of the Formulae I or II and, in addition, a compound of the Formula III.

Specific examples of useful compounds of the Formulae I, II and III are listed in Tables I, II, and III which follow. The preparation of specific compounds is discussed hereinafter.

TABLE I.—STABILIZERS HAVING THE TRIAZINE NUCLEUS COMPLETELY SUBSTITUTED ACCORDING TO THE GENERAL FORMULA I

| Code Name | Chemical Name 2,4,6-Substituted 1,3,5-Triazine | Preparation Described in Example— |
|---|---|---|
| I(a) | 6-(4-hydroxy-3,5-di-t-butylanilino)-2,4-bis-(n-octylthio)-1,3,5-triazine. | 1 |
| I(b) | 6-(4-hydroxy-3,5-di-t-butylanilino)-2,4-bis-phenylthio-1,3,5-triazine. | 2 |
| I(c) | 6-(4-hydroxy-3,5-di-t-butylanilino)-2,4-bis-(octadecylthio)-1,3,5-triazine. | 1 |
| I(d) | 6-(4-hydroxy-3,5-di-t-butylanilino)-2,4-bis-cyclohexylthio-1,3-5-triazine. | 1 |
| I(e) | 6-(2-hydroxy-3,5-di-t-butyl-6-methylanilino)-2,4-bis-(n-octylthio)-1,3,5-triazine. | 3 |
| I(f) | 6-(4-hydroxy-3,5-di-t-butylanilino)-2,4-bis-(2,3-dimethylphenylthio)-1,3,5-triazine. | 5 |
| I(g) | 6-(4-hydroxy-3,5-di-t-butylanilino)-2,4-bis-(carbo-n-lauryloxyethylthio)-1,3,5-triazine. | 4 |
| I(h) | 6-(4-hydroxy-3,5-di-t-butylanilino)-2,4-bis-(4-t-octylphenoxy)-1,3,5-triazine. | 4 |
| I(j) | 6-(4-hydroxy-3,5-di-t-butylanilino)-2,4-bis-(2-carbo-n-lauryloxyphenylthio)-1,3,5-triazine. | 4 |
| I(k) | 6-(4-hydroxy-3,5-di-t-butyl-N-benzylanilino)-2,4-bis-(n-octylthio)-1,3,5-triazine. | 6 |

TABLE II.—STABILIZERS HAVING THE TRIAZINE NUCLEUS SUBSTITUTED ACCORDING TO THE GENERAL FORMULA II

| Code Name | Chemical Name Substituted 1,3,5-Triazine | Preparation Described in Example— |
|---|---|---|
| II(a) | 6-(4-hydroxy-3,5-di-t-butylanilino)-4-n-octylthio-2-chloro-1,3,5-triazine. | 7 |
| II(b) | 4,6-bis-(4-hydroxy-3,5-di-t-butylanilino)-2-chloro-1,3,5-triazine. | 8 |

TABLE III.—STABILIZERS HAVING THE BENZOTRIAZOLE NUCLEUS

| Code name | Chemical name |
|---|---|
| III(a) | 2-(2'-hydroxy-5'-methylphenyl)-benzotriazole. |
| III(b) | 2-(2'-hydroxy-5'-t-butylphenyl)-benzotriazole. |
| III(c) | 2-(2'-hydroxy-5'-t-butylphenyl)-5-chloro-benzotriazole. |
| III(d) | 2-(2'-hydroxy-3'-methyl-5'-t-butylphenyl)-benzotriazole. |
| III(e) | 2-(2'-hydroxy-5'-amylphenyl)-benzotriazole. |
| III(f) | 2-(2'-hydroxy-3',5'-dimethylphenyl)-benzotriazole. |

It is an object of the invention to provide stabilized compositions of polypropylene which are normally solid at room temperature. It is another object of the invention to provide a method of stabilizing normally solid polypropylene by incorporating therein a minor portion, preferably from about 0.005 to about 10% (based on the total composition) of a stabilizing system which comprises DLTDP and at least one stabilizer selected from the compounds of the Formulae I through III inclusive.

Solid polymers of polypropylene find extensive use in various forms of plastic ware. Many different articles of manufacture are produced from polypropylene plastic materials which can be molded and shaped at higher temperatures while remaining relatively rigid at ordinary room temperature. Such thermoplastic molding or coating agents have high dielectric strength and excellent resistance to water, but unfortunately they are prone to attack by atmospheric oxidation and/or exposure to light, e.g. UV light. Moreover, during processing, such thermoplastic materials are subject to polymeric degradation due to thermal instability. Deterioration caused by one or more of the foregoing may lead to loss, e.g., of dielectric properties, and/or to discoloration, embrittlement or other physical breakdown.

The present invention presents a solution to the problem of how to check these deteriorating agencies so that the solid polypropylene thermoplastic materials may be processed and used in the final product with superior ageing characteristics at both room and elevated temperatures, better processing stability and improved resistance to ultraviolet degradation—in short, so that the polypropylene resins employing the stabilizer system of this invention have superior stability characteristics.

While the present stabilizer system employs DLTDP as a basic component, surprisingly, said system goes far beyond the expected stabilizing power of DLTDP alone. Compositions comprising polypropylene and DLTDP alone, possess far less desirable stability characteristics than polypropylene resins stabilized with the system according to the present invention. Moreover, the superior results obtained cannot be explained as a mere additive effect. For example, when 0.5% DLTDP and 0.1% of 6 - (4 - hydroxy-3,5-di-t-butylanilino)-2,4-bis-(n-octylthio)-1,3,5-triazine together with 0.2% of 2-(2'-hydroxy-5'-methylphenyl)-benzotriazole are employed as a stabilizing system for polypropylene, a surprisingly high increase in ageing life and processing stability at elevated temperatures, as well as resistance to ultraviolet light is obtained. It is entirely unexpected that the improvement in stability characteristics of the polypropylene is significantly greater than the improvement realized when each of the individual components of the stabilizer system is employed alone under the same conditions. The improvement from the combined stabilizer system is far greater than the sum of the individual improvements due to the single stabilizer components when employed alone in the polypropylene; thus, a true synergism is produced. This synergism is observed, for example, not only in at least a three component system comprising DLTDP, a stabilizer of the Formulae I and/or II and a stabilizer of the Formula III, but it is also observed in a two component system comprising DLTDP and a stabilizer of the Formula I, II or III.

Some of the individual stabilizer compounds of the invention are known in the chemical art. For example, DLTDP is a known compound. Moreover, the benzotriazole compounds are also known. They are prepared, for example, by coupling an aryl diazonium compound with an amino compound of the benzene or naphthalene series, said coupling to be in the position ortho to a primary amine group, and thereafter oxidizing the orthoaminoazo compounds thus formed to the corresponding 1,2,3-triazole compound.

Alternatively, the benzotriazoles may be obtained by coupling orthonitroaryl diazonium compounds of the benzene or naphthalene series with phenols or naphthols, said coupling to be in the ortho- or para-positions. The orthonitroaryl diazonium compounds may also be coupled with amines of the benzene or naphthalene series, said coupling to be in the position para to a primary amino group. Thereafter, the orthonitroazo compounds are reduced, e.g. with ammonium sulfide or with zinc in an alkaline medium to form the 1,2,3-triazole compounds.

The triazine stabilizers of the Formulae I and II are prepared by reaction of a suitable triazine with the appropriate reagent to yield the desired substituted triazine compound. Cyanuric chloride is advantageously employed as starting material. The preparation of the triazine stabilizers is more fully illustrated in the examples which follow hereinafter.

Any propylene polymer which is normally solid at ordinary room temperature may be stabilized with the system according to the invention.

The stabilizer system of the invention may be incorporated into polypropylene during milling, extruding, or any other suitable process. Moreover, said stabilizer system may be advantageously preformed before incorporation into the solid polymer. Alternatively, the individual components of the stabilizer system may be incorporated into the polypropylene separately or in combination with one or several other components. Concentrations of from about 0.005% to about 5% by weight of the stabilizer system, based upon the total stabilized composition, are advantageously employed according to the invention. However, from the examples which follow hereinafter, it will be seen that a concentration (based on total composition) of about 0.5% by weight of DLTDP, about 0.1% by weight of I(a), and about 0.2% by weight of III(a), produces very good results. However, when about 0.5% by weight of I(a) is employed, very good results are also obtained.

Moreover, in a two component system comprising about 0.5% by weight of I(a) and about 0.5% by weight of DLTDP good results are obtained. Likewise, when about 1% by weight of DLTDP and about 0.2% by weight of 2-(2'-hydroxy-5'-methylphenyl)-benzotriazole are employed, good results are also obtained as compared with polypropylene containing about 1% DLTDP alone.

Further objects and advantages of the invention will be observed from the examples which follow hereinafter. These examples are meant for illustration purposes and are not intended to limit the scope of the invention in any way. Unless otherwise noted in said examples, parts are by weight and the relationship between weight and volume is as that of grams to cubic centimeters. The temperature is in degrees centigrade.

EXAMPLES

*Part I.—Preparation of triazine stabilizers*

EXAMPLE 1.—6-(4-HYDROXY-3,5-DI-t-BUTYLANILINO)-2,4-BIS-(n-OCTYLTHIO)-1,3,5-TRIAZINE (a) *4-nitroso-2,6-di-t-butylphenol.*—750 parts by volume of ethanol, cooled to 15°, are saturated with hydrogen chloride gas and then diluted by the addition of 4000 parts by volume of ethanol. 2,6-di-t-butylphenol (824 parts) is dissolved in the alcoholic solution and a solution of sodium nitrite (304 parts in 400 parts by volume of water) ils added at 15–20° over a period of one hour while stirring. Stirring is continued for another 2 hours while allowing the temperature to rise to room temperature. 2000 parts by volume of water are added and the product is then separated by filtration and washed well with water. The filter cake is slurried in 3000 parts by volume of petroleum ether, filtered, washed on the filter with 1000 parts by volume of petroleum ether and dried in a vacuum oven at 70–80°. The yield of 4-nitroso-2,6-di-t-butylphenol, melting at 219°, is 848 parts (90.2%).

(b) *4 - amino - 2,6-di-t-butylphenol.*—4-nitroso-2,6-di-t-butylphenol (176 parts) is dissolved in 600 parts by volume of 5 N sodium hydroxide and 1200 parts by volume of water and a solution of sodium hydrosulfite (522 parts) in 2200 parts by volume of water is added with moderate speed (about 30 minutes), during which time the temperature rises to 53°. After the addition is completed, stirring is continued for 2½ hours after which the product is filtered rapidly, washed with 4000 parts by volume of water and dried in a vacuum desiccator over phosphoric anhydride. The yield of 4-amino-2,6-di-t-butylphenol, melting at 105–108° is 162.3 parts (98.5%).

(c) *6-(4-hydroxy-3,5-di-t-butylanilino) - 2,4-dichloro-1,3,5-triazine.*—A solution of cyanuric chloride (18.4 parts) in boiling acetone (100 parts by volume) is poured in a thin stream while stirring into 200 parts by volume of ice-water, keeping the temperature at 0–5° with external cooling. 4-amino-2,6-di-t-butylphenol (22.1 parts) and sodium carbonate (5.3 parts) are added and the reaction mixture is stirred vigorously at 8–10° for 45 minutes. The mixture is then diluted by the addition of 100 parts by volume of acetone and stirring is continued for an additional hour at 8–10°. The suspension is then poured into 500 parts by volume of ice-water, the precipitate is filtered off and dried in vacuo. The yield of 6-(4-hydroxy-3,5-di-t-butylanilino) - 2,4-dichloro - 1,3,5 - triazine in 34.8 parts (94%). The product melts at 144°.

(d) *6-(4-hydroxy-3,5-di-t-butylanilino) - 2,4-bis-(n-octylthio)-1,3,5-triazine.*—An alcoholic solution of sodium n-octylmercaptide (prepared by dissolving 2.3 parts of sodium in 50 parts by volume of ethanol and adding 14.6 parts of n-octylmercaptan) is added rapidly with stirring to a solution of 18.5 parts of 6-(4-hydroxy-3,5-di-t-butylanilino)-2,4-dichloro-1,3,5-triazine in 150 parts by volume of ethanol. The reaction mixture is stirred and refluxed for 1½ hours. After cooling to room temperature, 500 parts by volume of water are added. The precipitated product is separated by filtration and washed well with water. Purification of the product is accomplished by dissolving in 300 parts by volume of boiling ethanol, adding activated carbon, filtering and slowly recrystallizing. The 6-(4 - hydroxy-3,5-di-t-butylanilino)-2,4-bis-(n-octylthio)-1,3,5-triazine, which crystallizes as white needles, is filtered off, washed with cold ethanol and is dried in vacuo yielding 10.6 parts melting at 92–95°. Additional 8.6 parts having the same melting point are obtained by concentration of the mother liquor. The total yield is 65.5% of the theoretical yield.

By replacing n-octylmercaptan by cyclohexylmercaptan and n - octadecylmercaptan, respectively, the following compounds are obtained:

6 - (4 - hydroxy - 3,5 - di-t-butylanilino) - 2,4 - bis - (cyclohexylthio)-1,3,5-triazine, M.P. 171–172° (recryst. from methanol)

6 - (4 - hydroxy - 3,5 - di-t-butylanilino) - 2,4 - bis-(n-octadecylthio) - 1,3,5 - triazine, M.P. 86–88° (recryst. from ethanol and petroleum ether)

EXAMPLE 2.—6-(4-HYDROXY-3,5-DI-t-BUTYLANILINO)-2,4-BIS-(PHENYLTHIO)-1,3,5-TRIAZINE

A mixture of 11.1 parts of 6-(4-hydroxy-3,5-di-t-butylanilino)-2,4-dichloro-1,3,5-triazine [preparation described in Example 1(a) through (c)], 6.6 parts of thiophenol and 7.74 parts of pyridine in 100 parts by volume of acetone is stirred at room temperature for 30 minutes, after which the reaction mixture is stirred and refluxed for 1½ hours. After being cooled to room temperature the pyridine hydrochloride is filtered off and the filtrate is flooded with water causing the formation of a gummy precipitate. The supernatant liquid is decanted and the resulting viscous mass is boiled with ethanol (100 parts by volume). On cooling 6 - (4 - hydroxy-3,5-di-t-butylanilino)-2,4-bis-(phenylthio)1,3,5-triazine separates in the form of yellow crystals. The product is filtered, washed with ethanol and dried in vacuo yielding 10.5 parts which melt at 169–170°. A second crop of 0.5 part is obtained by chilling the mother liquor. The total actual yield is 71.4% of the theoretical yield.

EXAMPLE 3.—6-(2-HYDROXY-3,5-DI-t-BUTYL-6-METHYLANILINO)-2,4-BIS-(n-OCTYLTHIO)-1,3,5-TRIAZINE (a) *2,4-bis-(n-octylthio)-6-chloro - 1,3,5-triazine.*—A solution of 36.8 parts of cyanuric chloride, 58.4 parts of n-octylmercaptan and 0.3 part by volume of pyridine in 100 parts by volume of xylene is refluxed for 6 hours while passing nitrogen through the reactants, until the evolution of hydrogen chloride has ceased. The solution is filtered from a small amount of insoluble material and the solvent is stripped off with a water pump and finally the residue is vacuum distilled. The 2,4-bis-(n-octylthio) - 6-chloro - 1,3,5 - triazene, weighing 43 parts (53.5%), distills at 206–208° under 0.075 mm. Hg.

(b) *6-(2-hydroxy-3,5-di-t-butyl-6-methylanilino) - 2,4-bis-(n-octylthio)-1,3,5-triazine.*—A mixture of 10.1 parts of 2,4-bis-(n-octylthio)-6-chloro-1,3,5-triazine, 5.88 parts of 2-amino-3-methyl-4,6-di-t-butylphenol and 100 parts of water is gradually warmed with stirring under a nitrogen atmosphere to 90° and at the same time the pH is maintained at 6–7 by the addition of 5 N sodium hydroxide. When the pH remains constant the reaction is complete. The product, 6 - (2-hydroxy - 3,5-di-t-butyl-6 - methylanilino)-2,4-bis-(n-octylthio)-1,3,5-triazine, is recovered as an intractable oil, weighing 8.4 parts (56%).

*Analysis.*—Calculated for $C_{34}H_{58}N_4S_2O$: C, 67.72%; H, 9.69%; N, 9.29%; S, 10.64%. Found: C, 67.47%; H, 9.41%; N, 9.05%; S, 10.46%.

EXAMPLE 4.—6-(4-HYDROXY-3,5-DI-t-BUTYLANILINO)-2-4-BIS-(4-t-OCTYLPHENOXY)-1,3,5-TRIAZINE

An alcoholic solution of sodium p-t-octylphenoxide (prepared by dissolving 0.92 part of sodium in 75 parts by volume of ethanol and adding 8 parts of p-t-octylphenol) is added rapidly with stirring to a slurry of 7.4 parts of 6-(4-hydroxy-3,5-di-t-butylanilino)-2,4-dichloro-1,3,5-triazine [preparation as in Example 1(c) hereinabove] in 25 parts of ethanol. After the exothermic reaction subsides, the reaction is allowed to stand for several hours, then poured into 500 parts of water. The gummy solid is separated by filtration, and purification is accomplished by recrystallization from methanol. The 6-(4-hydroxy - 3,5-di-t-butylanilino) - 2,4-bis-(4-t - octylphenoxy)-1,3,5-triazine, after filtration, washing and drying, weighs 5.1 parts (36.4%) and melts at 99–101°.

By replacing p-t-octylphenol with n-dodecyl-β-mercaptopropionate and with n-dodecyl-2-mercaptobenzoate (prepared by esterification of 2-mercaptobenzoic acid: B.P. 180–184°/.050 mm. Hg) respectively, the following compounds are obtained in an analogous manner:

6-(4-hydroxy - 3,5-di-t-butylanilino) - 2,4-bis-(carbo-n-lauryloxyethylthio)-1,3,5-triazine (intractable oil isolated by ether extraction).

*Analysis.*—Calculated for $C_{47}H_{80}O_5N_4S_2$: S, 7.58%. Found: 7.27%.

6-(4-hydroxy - 3,5-di-t-butylanilino) - 2,4-bis-(2-carbo-n-lauryloxyphenylthio)-1,3,5-triazine (isolated by elution chromatography using a silica gel column).

*Analysis.*—Calculated for $C_{55}H_{80}N_4S_2O_5$: C, 70.17%; H, 8.56%; N, 5.95%. Found: C, 69.68%; H, 9.02%; N, 6.06%.

EXAMPLE 5.—6-(4-HYDROXY-3,5-DI-t-BUTYLANILINO)-2,4-BIS-(2,3-DIMETHYLPHENYLTHIO)-1,3,5-TRIAZINE

An alcoholic solution of sodium 2,3-dimethylphenyl mercaptide (prepared by dissolving 0.92 part of sodium in 75 parts by volume of ethanol and adding 5.6 parts of 2,3-dimethyl-thiophenol) is added with mixing to a solution of 7.4 parts of 6-(4-hydroxy-3,5-di-t-butylanilino)-2,4-dichloro-1,3,5-triazine in 200 parts by volume of ethanol. After the exothermic reaction has subsided the reaction is allowed to stand at room temperature for several hours; the salt is removed by filtration and the ethanol removed from the filtrate by evaporation. The oily residue therefrom is then dissolved in hexane and adsorbed on a silica gel column. After removing impurities by eluting with hexane, the product, 6-(4-hydroxy-3,5-di-t-butylanilino) - 2,4-bis-(2,3-dimethylphenylthio)-1,3,5-triazine is eluted with 50% by volume of benzene-hexane. Evaporation of the solvent leaves a light viscous oil. The yield is 4.3 parts (37.7%).

*Analysis.*—Calculated for $C_{33}H_{40}ON_4S_2$: C, 69.2%; H, 7.04%; N, 9.78%, S, 11.19%. Found: C, 69.52%; H, 7.6%; N, 9.65%; S, 11.62%.

EXAMPLE 6.—6-(4-HYDROXY-3,5-DI-t-BUTYL-N-BENZYLANILINO)-2,4-BIS-(n-OCTYLTHIO)-1,3,5-TRIAZINE (a) *4-(N-benzylidineamino) - 2,6-di-t-butylphenol.*—A solution of 22.1 parts of 4-amino-2,6-di-t-butylphenol [prepared as described above in Example 1] and 11.66 parts of benzaldehyde in 100 parts by volume of dry benzene is refluxed until 1.8 parts of water are azeotropically collected in a Dean-Stark trap. After cooling the reflux mixture, the crystalline mass which forms is filtered off, washed with cold heptane and dried in vacuo. The 4-N-benzylidineamino - 2,6-di-t-butylphenol so obtained, weighs 22.0 parts and melts at 151–153°. A second crop of crystalline product, weighing 4.3 parts and having the same melting point, is obtained by concentrating the filtrates. The total yield is 85.27% of theory.

(b) *4-(N-benzylamino)-2,6-di-t-butylphenol.*—A solution of 15.45 parts of 4-(N-benzylidineamino)-2,6-di-t-butylphenol in 250 parts by volume of glacial acetic acid is charged to a hydrogenation vessel, 0.2 part of 10% palladium on charcoal added and the whole mixture is shaken under a hydrogen atmosphere until the theoretical amount of hydrogen had been absorbed. The catalyst is then removed by filtration and the free acetic acid is removed by distillation under reduced pressure over a hot water bath at 50–60°. 100 parts of water is added to the residue from distillation; the pH is adjusted to 12 with 5 N sodium hydroxide and the resultant amine is extracted into 250 parts by volume of ether. The ether solution is washed with water and dried over anhydrous magnesium sulfate. After removal of the magnesium sulfate by filtration, the ether is evaporated and the residue is triturated with 50 parts by volume of cold petroleum ether and then washed twice with 25 parts by volume of cold petroleum ether each time. After drying, the 4-(N-benzylamino)-2,6-di-t-butylphenol weighs 5.67 parts (36.5% yield) and melts at 90–94°.

(c) *6 - (4-hydroxy-3,5-di-t-butyl-N-benzylanilino)-2,4-bis - (n-octylthio) - 1,3,5-triazine.*—This synthesis is carried out in a manner similar to that described above for the preparation of 6-(2-hydroxy - 3-t-butyl-5-methylanilino)-2,4-bis-(n-octylthio)-1,3,5-triazine (Example 11) by substituting 4-(N-benzylamino) - 2,6-di-t-butylphenol for 2-amino-4-methyl-6-t-butylphenol. After purification with a silica gel column, the 6-(4-hydroxy-3,5-di-t-butyl-N-benzylanilino)-2,4-bis-(n-octylthio)-1,3,5-triazine is obtained as a waxy solid melting at 36°. The yield is 36% of theory.

EXAMPLE 7.—6-(4-HYDROXY-3,5-DI-t-BUTYLANILINO)-4-n-OCTYLTHIO-2-CHLORO-1,3,5-TRIAZINE

An alcoholic solution of sodium n-octylmercaptide (prepared by dissolving 0.23 part of sodium in 10 parts by volume of ethanol and adding 1.46 parts of n-octylmercaptan) is added rapidly to a slurry of 3.69 parts of 6-(4-hydroxy - 3,5 - di - t-butylanilino)-2,4-dichloro-1,3,5-triazine [preparation described in Example 1(a) through (c)] in 10 parts by volume of ethanol. An immediate exothermic reaction ensues, but external cooling is applied and the reaction mixture is kept at room temperature for ½ hour, after which said mixture is poured into 50 parts by volume of water and an oil separates which solidifies upon cooling. The 6 - (4-hydroxy-3,5-di-t-butylanilino)-4-n-octylthio-2-chloro-1,3,5-triazine, thus obtained, is filtered, washed with water until free of chloride ion, and finally recrystallized twice from hexane. The purified compound weighs 2.04 parts (42.5%) and melts at 119–120°.

EXAMPLE 8.—4,6-BIS-(4-HYDROXY-3,5-DI-t-BUTYLANILINO)-2-CHLORO-1,3,5-TRIAZINE

A solution of 4.6 parts of cyanuric chloride in 100 parts by volume of boiling acetone is poured in a thin stream into 200 parts by volume of ice-water while stirring and keeping the temperature of 0–5° by means of external cooling of the mixture. 4-amino-2,6-di-t-butylphenol (16.7 parts) and sodium bicarbonate (6.3 parts) are then added and the temperature is maintained at 10° for 45 minutes while vigorously stirring; then the temperature is kept at 50° for 45 minutes, and finally at reflux for 45 minutes. The brown solid which precipitates is filtered off, washed well with water and petroleum ether and is finally recrystallized from dioxane-hexane (5:4). The product 4,6-bis-(4-hydroxy-3,5-di-t-butylanilino)-2-chloro-1,3,5-triazine weighs 5.05 parts (37%) and melts under decomposition at 304°.

Part II.—Stabilization of polypropylene

EXAMPLE 9

Unstabilized polypropylene (Hercules PROFAX 6501) is thoroughly blended with 0.5% by weight of dilauryl-beta-thio-di-propionate, (DLTDP), 0.1% by weight of 6 - (4-hydroxy-3,5-di-t-butylanilino)-2,4-bis-(n-octylthio)-1,3,5-triazine [I(a)] and 0.2% of 2-(2′-hydroxy-5′-methylphenyl)-benzotriazole [III(α)]. The blended material thereafter is milled on a two roller mill at 182° for six minutes, after which time the stabilized polypropylene is sheeted from the mill and allowed to cool.

The milled polypropylene sheet, thus stabilized is then cut into small pieces and pressed for seven minutes on a hydraulic press at 218° and 2000 pounds per square inch pressure. The resultant sheet of 25 mil thickness is then tested for resistance to accelerated ageing in a forced draft oven at 149°. The stabilized polypropylene is not subject to deterioration after 300 hours in the oven while the unstabilized material deteriorates after about 3 hours; polypropylene stabilized with 0.5% DLTDP alone, failed after 92 hours; with 0.5% I(a) alone failed after 56 hours, and with 0.5% III(a) alone failed after 7 hours.

The so stabilized polypropylene is not subject to embrittlement or crazing upon exposure in the Fade-ometer after more than 250 hours, while on prolonged outdoor exposure the stabilized polypropylene (25 mil films) does not exhibit deterioration after more than 36½ weeks.

At elevated temperatures, for example about 300°, the so stabilized polypropylene exhibits very good processing stability and very little polymer degradation as compared to the unstabilized polypropylene.

If in the foregoing Example 9, the concentrations of DLTDP, I(a) and III(a) are varied within the stabilizer system so that concentrations of 0.05%, 0.8%, and 2% by weight, respectively, are employed, then in a similar fashion good results are obtained.

EXAMPLE 10

A stabilized polypropylene sheet is prepared in the same manner as in Example 9, the stabilizer system comprising 0.1% by weight of I(a) and 1% by weight of DLTDP. The so stabilized sheet of polypropylene remains without deterioration after 900 hours in the forced draft oven (description in Example 9). A similar sheet of polypropylene stabilized with 1% by weight of DLTDP alone fails in the oven after only 420 hours while stabilizer I(a) at a concentration of 0.1% by weight alone in polypropylene under similar conditions fails after 56 hours.

Similar stabilized compositions of polypropylene containing 0.1% of the triazine I(a) are obtained with 0.05%, 0.1%, 0.8%, and 2% respectively of DLTDP.

The polypropylene sheet stabilized with 0.1% by weight of I(a) and 1% by weight of DLTDP is stabilized against exposure to ultraviolet light and also exhibits good processing stability at elevated temperatures, for example in the range of 300°.

The other triazines, set forth in Tables I and II above, are also useful in the same manner as the triazine I(a) at concentrations of 0.05%, 0.1%, 0.8%, and 2% by weight respectively.

EXAMPLE 11

Stabilized polypropylene sheets are prepared in the same fashion as in Example 9, having incorporated therein a stabilized system composed of 0.2% by weight of III(a), 0.5% by weight of DLTDP and 0.1% by weight of 4,6 - bis-(4-hydroxy-3,5-di-t-butylanilino)-2-chloro-1,3,5-triazine [II(b)]. The so obtained stabilized polypropylene exhibits very good stability to accelerated aging in the forced draft oven as described in Example 9, and is also stabilized against exposure to light. Said composition also has good processing stability at elevated temperatures, for example at 300°.

If, in Example 11, 0.1% of each of the compounds respectively, set forth in Tables I and II, is substituted for II(b), then similarly good results respectively are obtained. Good results are also obtained when each of the components, i.e. triazine, triazole and DLTDP are respectively 0.05%, 0.8%, and 2% by weight.

If, in Example 11, 0.5% by weight of each of the triazine compounds in Tables I and II respectively, is employed instead of 0.1% by weight, then similarly stabilized compositions of polypropylene are obtained.

The following Table IV is a summary of data illustrating the synergistic effect of some stabilizer systems according to the invention. In each case stabilization of polypropylene with 0.1% by weight of a triazine of the formula I or II is compared with the same weight of triazine in combination with 0.2% by weight of III(a), and 0.5% by weight of DLTDP. The asterisk (*) indicates the polypropylene composition stabilized with triazine, III(a) and DLTDP.

TABLE IV.—RESISTANCE OF POLYPROPYLENE SYSTEM TO ACCELERATED AGING AT 149° IN THE FORCED DRAFT OVEN

| Test System, Description | Oven Aging, Hours | |
|---|---|---|
| | Stabilization Time, Minimum | Time to Failure |
| I(a)*+Unstabilized Polypropylene | 300 | |
| I(a)+Unstabilized Polypropylene | | 74 |
| I(b)*+Unstabilized Polypropylene | 500 | |
| I(b)+Unstabilized Polypropylene | | 60 |
| II(a)*+Unstabilized Polypropylene | 200 | |
| II(a)+Unstabilized Polypropylene | | 53 |
| I(c)*+Unstabilized Polypropylene | 275 | |
| I(c)+Unstabilized Polypropylene | | 33 |
| I(d)*+Unstabilized Polypropylene | 325 | |
| I(d)+Unstabilized Polypropylene | | 75 |
| II(b)*+Unstabilized Polypropylene | 300 | |
| II(b)+Unstabilized Polypropylene | | 60 |
| I(e)*+Unstabilized Polypropylene | 425 | |
| I(e)+Unstabilized Polypropylene | | 7 |
| I(f)*+Unstabilized Polypropylene | 425 | |
| I(f)+Unstabilized Polypropylene | | 60 |
| I(g)*+Unstabilized Polypropylene | 425 | |
| I(g)+Unstabilized Polypropylene | | 30 |
| I(h)*+Unstabilized Polypropylene | 150 | |
| I(h)+Unstabilized Polypropylene | | 30 |
| I(j)*+Unstabilized Polypropylene | 200 | |
| I(j)+Unstabilized Polypropylene | | 30 |
| I(k)*+Unstabilized Polypropylene | 600 | |
| I(k)+Unstabilized Polypropylene | | 37 |
| III(a)+Unstabilized Polypropylene | | 7 |
| DLTDP+Unstabilized Polypropylene | | 92 |
| Unstabilized Polypropylene | | 5 |

What is claimed is:

1. A composition of matter which comprises a normally solid homopolymer of propylene stabilized against deterioration by a system comprising from about 0.5% to about 1%, by weight of total composition, of dilauryl β-thiodipropionate and at least one member selected from the group consisting of (a) a triazine of the formula:

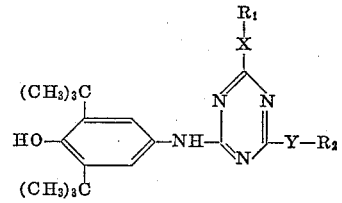

in which each of $R_1$ and $R_2$ is selected from the group consisting of alkyl of from 1 to 18 carbon atoms, phenyl, and alkylphenyl of from 7 to 24 carbon atoms; and each of X and Y is selected from the group of oxygen and sulfur, said triazine being present in an amount of about 0.1% by weight of total composition; and (b) a benzotriazole of the formula:

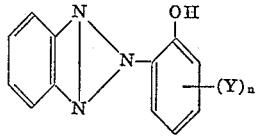

in which n has a value of from 1 to 2, and
Y is an alkyl group of from 1 to 6 carbon atoms, in a position selected from the group consisting of ortho and para to the hydroxy group.

said benzotriazole being present in an amount of about 0.2%, by weight of total composition.

2. A normally solid homopolymer of propylene stabilized against deterioration by a system comprising about 1%, by weight of total composition, of dilauryl β-thiodipropionate and about 0.1%, by weight of total composition, of 6-(4-hydroxy-3,5,-di-t-butylanilino)-2,4-bis-(octylthio)-1,3,5-triazine.

3. A normally solid homopolymer of propylene stabilized against deterioration by a system comprising about 0.5% of dilauryl β-thiodipropionate, about 0.1% of 6-(4-hydroxy - 3,5-di-t-butylanilino)-2,4-bis-(octylthio)-1,3,5-triazine and about 0.2% of 2 - (2' - hydroxy-5'-methylphenyl)benzotriazole, all percentages being based on weight of total composition.

4. A normally solid homopolymer of propylene stabilized against deterioration by a system comprising about 0.5% of dilauryl-β-thiodipropionate, about 0.1% of 6-(4 - hydroxy-3,5-di-t-butylanilino)-2,4-bis- (phenylthio)-1,3,5-triazine and about 0.2% of 2 - (2' - hydroxy - 5'-methylphenyl)benzotriazole, all percentages being based on weight of total composition.

5. A normally solid homopolymer of propylene stabilized against deterioration by a system comprising about 0.5% of dilauryl-β-thiodipropionate, about 0.1% of 6-(4 - hydroxy - 3,5 - di - t - butylanilino) - 2,4 - bis- (octadecylthio) - 1,3,5 - triazine and about 0.2% of 2- (2'-hydroxy-5'-methylphenyl)benzotriazole, all percentages being based on weight of total composition.

6. A composition of matter which comprises homopolymeric polypropylene stabilized with a stabilizer system comprising from about 0.5% to about 1%, by weight of total composition, of dilauryl-β-thiodipropionate and about 0.1%, by weight of total composition, of 6 - (4-hydroxy - 3,5 - di-t-butylanilino)-2,4-bis - (n - octylthio)-1,3,5 - triazine.

7. A composition of matter which comprises homopolymeric polypropylene stabilized with a stabilizer system comprising from about 0.5% to about 1%, by weight of total composition, of dilauryl-β-thiodipropionate and about 0.1%, by weight of total composition, of 6 - (4-hydroxy - 3,5-di-t-butylanilino)-2,4-bis-phenylthio - 1,3,5-triazine.

8. A composition of matter which comprises homopolymeric polypropylene stabilized with a stabilizer system comprising from about 0.5% to about 1%, by weight of total composition, of dilauryl-β-thiodipropionate and about 0.1%, by weight of total composition, of 6 - (4-hydroxy - 3,5-di-t-butylanilino)-2,4-bis - (octadecylthio)-1,3,5-triazine.

9. A composition of matter which comprises homopolymeric polypropylene stabilized with a stabilizer system comprising from about 0.5% to about 1%, by weight of total composition, of dilauryl-β-thiodipropionate and about 0.1%, by weight of total composition, of 6 - (4-hydroxy - 3,5-di-t-butylanilino)-2,4-bis - cyclohexylthio-1,3,5-triazine.

10. A composition of matter which comprises homopolymeric polypropylene stabilized with a stabilizer system comprising from about 0.5% to about 1%, by weight of total composition, of dilauryl-β-thiodipropionate and about 0.1%, by weight of total composition of 6 - (2-hydroxy - 3,5 - di-t-butyl-6-methylanilino) - 2,4 - bis - (n-octylthio)-1,3,5-triazine.

11. A composition of matter which comprises homopolymeric polypropylene stabilized with a stabilizer system comprising from about 0.5% to about 1%, by weight of total composition, of dilauryl-β-thiodipropionate and about 0.1%, by weight of total composition, of 6 - (4-hydroxy - 3,5 - di-t-butylanilino)-2,4-bis - (2,3 - dimethylphenylthio)-1,3,5-triazine.

12. A composition of matter which comprises homopolymeric polypropylene stabilized with a stabilizer system comprising from about 0.5% to about 1%, by weight of total composition, of dilauryl-β-thiodipropionate and about 0.1%, by weight of total composition, of 6 - (4-hydroxy - 3,5-di-t-butylanilino) - 2,4-bis(4-t-octylphenoxy)-1,3,5-triazine.

13. A composition of matter which comprises homopolymeric polypropylene stabilized with a stabilizer system comprising from about 0.5% to about 1%, by weight of total composition, of dilauryl - β - thiodipropionate, about 0.1%, by weight of total composition, of 6 - (4-hydroxy - 3,5-di-t-butylanilino)-2,4-bis - phenylthio-1,3,5-triazine and about 0.2%, by weight of total composition, of 2-(2'-hydroxy-5'-methylphenyl)-benzotriazole.

14. A composition of matter which comprises homopolymeric polypropylene stabilized with a stabilizer system comprising from about 0.5% to about 1%, by weight of total composition, of dilauryl - β - thiodipropionate, about 0.1%, by weight of total composition, of 6 - (4-hydroxy - 3,5-di-t-butylanilino)-2,4-bis - (octadecylthio)-1,3,5-triazine and about 0.2%, by weight of total composition, of 2-(2'-hydroxy-5'methylphenyl)-benzotriazole.

15. A composition of matter which comprises homopolymeric polypropylene stabilized with a stabilizer system comprising from about 0.5% to about 1%, by weight of total composition, of dilauryl - β - thiodipropionate, about 0.1%, by weight of total composition, of 6 - (4-hydroxy - 3,5-di-t-butylanilino)-2,4-bis - cyclohexylthio-1,3,5-triazine and about 0.2%, by weight of total composition, of 2-(2'-hydroxy-5'-methylphenyl)-benzotriazole.

16. A composition of matter which comprises homopolymeric polypropylene stabilized with a stabilizer system comprising from about 0.5% to about 1%, by weight of total composition, of dilauryl - β - thiodipropionate, about 0.1%, by weight of total composition, of 6 - (4-hydroxy - 3,5-di-t-butylanilino)-2,4-bis-(2,3 - dimethylphenylthio-1,3,5-triazine and about 0.2%, by weight of total composition, of 2-(2'-hydroxy-5'-methylphenyl)-benzotriazole.

17. A composition of matter which comprises homopolymeric polypropylene stabilized with a stabilizer system comprising from about 0.5% to about 1%, by weight of total composition, of dilauryl - β - thiodipropionate, about 0.1%, by weight of total composition, of 6 - (4-hydroxy - 3,5-di-t-butylanilino)-2,4-bis - (4-t-octylphenoxy)-1,3,5-triazine and about 0.2%, by weight of total composition, of 2 - (2'-hydroxy-5'-methylphenyl) - benzotriazole.

References Cited by the Examiner
UNITED STATES PATENTS

| | | | |
|---|---|---|---|
| 2,519,755 | 8/50 | Gribbins | 260—45.85 |
| 2,676,150 | 4/54 | Loughran et al. | 260—249.5 |
| 2,720,480 | 10/55 | Wolf | 260—249.5 |
| 2,820,032 | 1/58 | Hill | 260—249.5 |
| 2,953,560 | 9/60 | Baker et al. | 260—248 |
| 2,972,597 | 2/61 | Newland et al. | 260—45.85 |
| 3,004,896 | 10/61 | Heller et al. | 260—45.8 |
| 3,018,269 | 1/62 | Bruno | 260—45.8 |
| 3,074,910 | 1/63 | Dickson | 260—45.8 |

LEON J. BERCOVITZ, *Primary Examiner.*

A. D. SULLIVAN, *Examiner.*